US012759088B2

(12) United States Patent
Malchus et al.

(10) Patent No.: US 12,759,088 B2
(45) Date of Patent: Oct. 13, 2026

(54) METHODS FOR LASER CUTTING GLASS SUBSTRATES THROUGH NARROW APERTURES

(71) Applicant: 4JET MICROTECH GMBH, Alsdorf (DE)

(72) Inventors: Reinhard Moritz Malchus, Munich (DE); Lauren Leigh Taylor, Williamsport, PA (US); Craig John Mancusi Ungaro, Corning, NY (US)

(73) Assignee: 4JET MICROTECH GMBH, Alsdorf (DE)

( * ) Notice: Subject to any disclaimer, the term of this patent is extended or adjusted under 35 U.S.C. 154(b) by 975 days.

(21) Appl. No.: 17/976,184

(22) Filed: Oct. 28, 2022

(65) Prior Publication Data

US 2023/0132480 A1 May 4, 2023

Related U.S. Application Data

(60) Provisional application No. 63/275,129, filed on Nov. 3, 2021.

(51) Int. Cl.
*B23K 26/53* (2014.01)
*B23K 26/0622* (2014.01)
(Continued)

(52) U.S. Cl.
CPC .......... *B23K 26/53* (2015.10); *B23K 26/0624* (2015.10); *B23K 26/0648* (2013.01); *B23K 26/073* (2013.01); *B23K 2103/54* (2018.08)

(58) Field of Classification Search
None
See application file for complete search history.

(56) References Cited

U.S. PATENT DOCUMENTS

2015/0299018 A1 10/2015 Bhuyan et al.
2017/0106476 A1* 4/2017 Sakamoto ............ B23K 26/064
(Continued)

FOREIGN PATENT DOCUMENTS

CN 202189161 U 4/2012
CN 104968620 A 10/2015
(Continued)

OTHER PUBLICATIONS

Arnold et al., "Multiscale Bessel beams generated by a tunable acoustic gradient index of refraction lens," Opt. Lett. 31, 2016, pp. 3155-3157.

(Continued)

*Primary Examiner* — Edward F Landrum
*Assistant Examiner* — Theodore J Evangelista
(74) *Attorney, Agent, or Firm* — Womble Bond Dickinson (US) LLP

(57) ABSTRACT

A method of laser processing a glass substrate comprising focusing a pulsed laser beam into a laser beam focal line into the glass substrate, the glass substrate having a feature formed on a first surface of the glass substrate, wherein a first portion of the laser beam focal line is focused at the first surface of the glass substrate and a second portion of the laser beam focal line is focused at a second surface of the glass substrate that is opposite the first surface, and translating the glass substrate and the laser beam relative to each other along a first contour, thereby laser forming a plurality of defect lines along the first contour within the substrate.

19 Claims, 4 Drawing Sheets

(51) Int. Cl.

| | |
|---|---|
| ***B23K 26/064*** | (2014.01) |
| ***B23K 26/073*** | (2006.01) |
| ***B23K 103/00*** | (2006.01) |

(56) References Cited

U.S. PATENT DOCUMENTS

| | | | | |
|---|---|---|---|---|
| 2019/0129093 | A1* | 5/2019 | Li | H01S 5/02251 |
| 2020/0254557 | A1 | 8/2020 | Boek et al. | |
| 2023/0311245 | A1* | 10/2023 | Flamm | B23K 26/062 219/121.72 |

FOREIGN PATENT DOCUMENTS

| | | | |
|---|---|---|---|
| KR | 10-2017-0019855 | A | 2/2017 |
| WO | 2015107044 | A1 | 7/2015 |

OTHER PUBLICATIONS

International Search Report and Written Opinion of the International Searching Authority; PCT/US2022/048347; mailed on Mar. 14, 2023, 11 pages; European Patent Office.

Lu, et al., "Non-diffraction-length, tunable, Bessel-like beams generation by spatially shaping a femtosecond laser beam for high-aspect ratio micro-hole drilling," Opt. Express 26, 2018, pp. 21960-21968.

RaCiukaitis et al., "Non-ideal axicon-generated Bessel beam application for intra-vol. glass modification," Opt. Express 24, 2016, pp. 28433-28443.

Ropot et L., "Bessel-like beams with z-dependent cone angles," Opt. Express 18, 2010, pp. 1966-1973.

Taiwanese Office Action for TW Application No. 111141013, dated Apr. 23, 2026, 5 pages.

* cited by examiner

METHODS FOR LASER CUTTING GLASS SUBSTRATES THROUGH NARROW APERTURES

This application claims the benefit of priority to U.S. Provisional Patent Application Ser. No. 63/275,129 filed on Nov. 3, 2021, the content of which is relied upon and incorporated herein by reference in its entirety.

FIELD

The present disclosure relates to methods for laser cutting glass substrates, and more specifically cutting of glass substrates through narrow apertures using Bessel beams with continuously changing deflection angles.

BACKGROUND

The area of laser processing of materials encompasses a wide variety of applications that involve cutting, drilling, milling, welding, melting, etc. and different types of materials. Among these applications, one that is of particular interest is the cutting of glass substrates between or near features formed on the surface of the glass substrate, including but not limited to, deposited electrodes, black-matrix, and metal/polymer coatings.

Currently, non-diffracting Bessel beams are used to cut glass parts. Bessel beams are used because they form long, narrow focal regions (a cylinder about 1 μm in radius and 1 mm long, where the cylinder radius is adjustable by beam deflection angle and the cylinder length is adjustable by the beam deflection angle and input Gaussian beam diameter, both of which depend on the wavelength) as opposed to the much shorter foci of Gaussian beams (about 1 μm in radius and only few μm long). When a Bessel beam is created using an ultrafast laser, the long focal region results in a defect region being formed through the entire thickness of a glass sheet in a single shot. If the laser is scanned across the glass orthogonal to the laser propagation direction, adjacent damage regions will be formed which generate a defect plane. This plane is a weak point in the glass, and if the glass is thermally or mechanically separated, it will break at the site of the defect plane.

When a Bessel beam is incident upon the front surface of a glass workpiece, it will have a certain required width dependent on its focusing angle (referred to as the beam deflection angle), depth of focus, and the distance from the focusing objective to the glass sheet. The beam width impacts the capability for through-glass damage.

The width of the beam also controls the preservation of pre-existing surface features during processing. Because laser energy is distributed across the beam, any surface features (e.g. electrodes) falling inside of this width (referred to as the laser-affected zone, "LAZ") can be damaged by the beam. When cutting glass between two parallel features, the clear-aperture between the features is referred to as the street width. Typical Bessel beams will have a LAZ of 500 μm to 1 mm diameter, severely restricting the minimum widths of the streets through which the laser can cut. Reducing the beam width input into the optical system can reduce the LAZ, however, a corresponding reduction in the beam deflection angle will be required to ensure that the beam is long enough to focus throughout the entire thickness of the glass piece. Additionally, the beam diameter does not necessarily correspond to the width of the processed street because the Bessel beam depth of focus is typically not matched to the actual glass thickness and incident rays hit the surrounding surface of the aperture causing a larger LAZ. Although the depth of focus can be reduced to better match the glass thickness by reducing the input Gaussian beam diameter, the low energy in the Gaussian wings does not contribute to the cutting depth so the working beam diameter must still be slightly larger than necessary, impacting the minimum LAZ.

Attempting to decrease the LAZ diameter further via a reduction of the beam deflection angle can encounter additional problems such as having insufficient laser damage to cut the glass due to the lower intensity by increasing the cylinder radius. Another limitation when approaching smaller working beam deflection angles is the onset of a weak damage area formed below the glass entrance surface. Variation in laser power and/or pitch to overcome this weak damage region can lead to unwanted ablation effects on the surface of the glass substrate.

While parts can be cut before metal traces are deposited on their surfaces, this restricts parallel processing where multiple parts are made simultaneously on a single glass substrate. Additionally, laser processing of bare substrates with non-diffracting beams can generate undesired damage including reduced surface planarity, roughness, surface debris, and glass strength degradation. These side-effects may contaminate later processes or require corrective processing steps such as cleaning, polishing, grinding, multiple etching steps, and/or special equipment to hold weakened glass wafers.

Accordingly, the inventors have developed improved techniques to generate through-glass laser damage in close proximity to pre-fabricated sensitive structures without damaging the structure itself.

SUMMARY

In one embodiment, a method of laser processing a glass substrate, the method comprising: focusing a pulsed laser beam into a laser beam focal line, which is formed via an optical arrangement and oriented along the beam propagation direction and directed into the glass substrate, the glass substrate having a feature formed on a first surface of the glass substrate, the laser beam focal line generating an induced absorption within the glass substrate, and the induced absorption producing a defect line along the laser beam focal line within the substrate, wherein a first portion of the laser beam focal line is focused at the first surface of the glass substrate and a second portion of the laser beam focal line is focused at a second surface of the glass substrate that is opposite the first surface, wherein a first set of light rays exiting the optical arrangement at a first radius R1, as measured from a center of the optical arrangement forms the first portion of the laser beam focal line with a deflection angle of $\theta_1$, wherein a second set of light rays exiting the optical arrangement at a second radius R2, as measured from the center of the optical arrangement forms the second portion of the laser beam focal line with a deflection angle of $\theta_2$, wherein R1 is less than R2; and wherein $\theta_1$ is greater than $\theta_2$, and wherein $\theta_1$ decreases to $\theta_2$ from R1 to R2 in one of a step-wise decrease or a graded decrease; and translating the glass substrate and the laser beam relative to each other along a first contour, thereby laser forming a plurality of defect lines along the first contour within the substrate.

A second embodiment of the present disclosure may include the first embodiment, wherein the first beam deflection angle $\theta_1$ is in a range from 5.5 degrees to 12 degrees.

A third embodiment of the present disclosure may include the first embodiment, wherein the second beam deflection angle $\theta_2$ is in a range from 2 degrees to 5 degrees.

A fourth embodiment of the present disclosure may include the first embodiment, wherein the first radius R1 is in a range from 100 μm to 1000 μm.

A fifth embodiment of the present disclosure may include the first embodiment, wherein the second radius R2 is larger than the first radius R1 by a range from 10 μm to 100 μm.

A sixth embodiment of the present disclosure may include the first embodiment, wherein the optical arrangement comprises: a spatial light modulator or diffractive optical element configured to generate the laser beam focal line, a first focusing optical element spaced apart from the spatial light modulator or diffractive optical element, and a second focusing optical element spaced apart from the first focusing optical element, wherein a ratio of the focal length of the first focusing optical element to the focal length of the second focusing optical element is about 5:1 to 50:1.

A seventh embodiment of the present disclosure may include the sixth embodiment, wherein an aperture is written on a surface of the spatial light modulator or diffractive optical element.

An eighth embodiment of the present disclosure may include the sixth embodiment, wherein a physical aperture is positioned before the spatial light modulator or diffractive optical element.

A ninth embodiment of the present disclosure may include the sixth embodiment, wherein a beam block is written on a surface of the spatial light modulator or diffractive optical element at the approximate center of the input light source.

A tenth embodiment of the present disclosure may include the ninth embodiment, wherein the beam block is a diffractive optical element or refractive optic.

An eleventh embodiment of the present disclosure may include the sixth embodiment, wherein an aperture is positioned between the spatial light modulator or diffractive optical element and the first focusing optical element.

A twelfth embodiment of the present disclosure may include the sixth embodiment, wherein the optical arrangement further comprises a diffraction effect reducing filter 514 positioned after a first focusing optical element.

A thirteenth embodiment of the present disclosure may include the first embodiment, wherein the pulsed laser produces pulse bursts with 2 to 20 pulses per pulse burst, with pulse burst energy of 200 to 2000 micro Joules per pulse burst.

A fourteenth embodiment of the present disclosure may include the first embodiment, further comprising separating the substrate along the first contour.

A fifteenth embodiment of the present disclosure may include the fourteenth embodiment, wherein separating the substrate along the first contour includes at least one of (i) applying a mechanical force to the substrate; (ii) directing a carbon dioxide ($CO_2$) laser beam into the substrate along or near the first contour; or (iii) applying an etchant to the first contour.

A sixteenth embodiment of the present disclosure may include the first embodiment, wherein the pulses have a duration of greater than about 2 picosecond.

A seventeenth embodiment of the present disclosure may include the first embodiment, wherein the bursts have a repetition rate in a range of about 1 kHz to 200 kHz.

An eighteenth embodiment of the present disclosure may include the first embodiment, wherein the laser beam focal line has an average spot diameter in a range of about 0.5 micron to 5 micron.

A nineteenth embodiment of the present disclosure may include the first embodiment, wherein the substrate has a thickness in a range of about 0.5 mm to 2 mm.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating the exemplary embodiments.

DETAILED DESCRIPTION

The present application provides a method for cutting and separation of glass substrates such as for example, alkaline earth boro-aluminosilicate glass substrates. Exemplary glass substrates cut and separated via the method described herein include, but are not limited to, for example TFT (thin film transistor) glass substrates such as Eagle XG®, or Corning Lotus™. The methods described herein advantageously generate through-glass laser damage in close proximity to pre-fabricated sensitive structures without damaging the pre-fabricated structures. The inventive methods may be utilized, for example, in the formation of integrated circuits as well as other suitable applications where cutting and separation of glass substrates in close proximity to pre-fabricated sensitive structures without damaging the pre-fabricated structures may be desired.

The process fundamental step described below is to create a vertical fault line that delineates the desired shape and establishes a path of least resistance for crack propagation and hence separation and detachment of the shape from its substrate matrix. The laser processing method can be tuned and configured to enable manual or mechanical separation, partial separation or total separation of glass shapes out of the original substrate.

Figure 1:
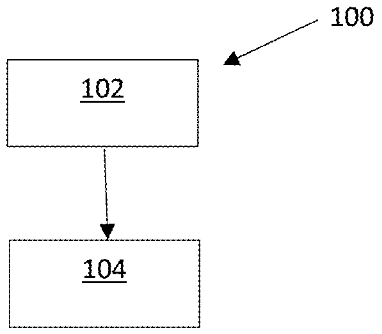
FIG. 1 depicts an exemplary method of laser processing a glass substrate.
Figure 2A:
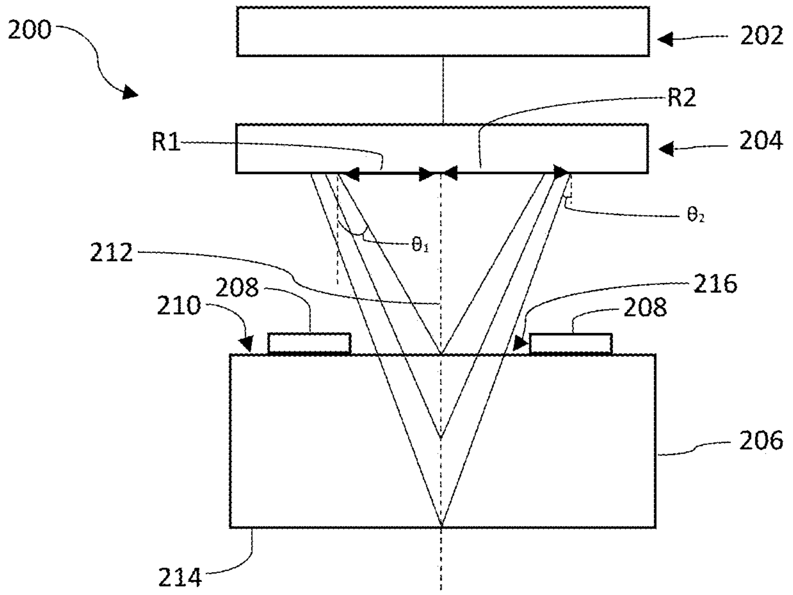
FIGS. 2A and 2B depict an exemplary laser processing system for processing a glass substrate in accordance with the exemplary method of FIG. 1.
Figure 2B:
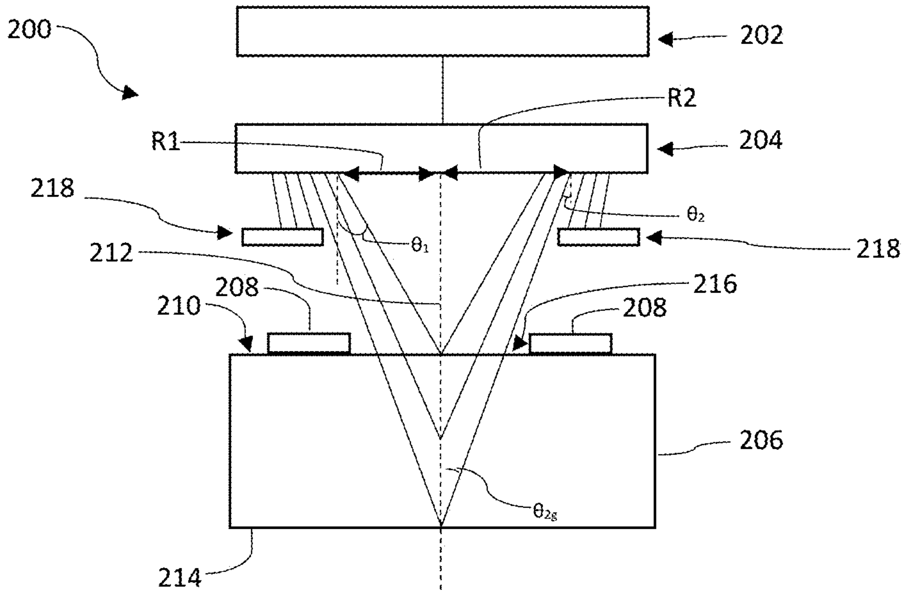

FIG. 1 depicts an exemplary method 100 of laser processing a glass substrate. FIG. 2A depicts an exemplary laser processing system 200 for processing a glass substrate 206 in accordance with exemplary method 100. FIG. 2B depicts an exemplary laser processing system 200 for processing a glass substrate 206 in accordance with exemplary method 100, the exemplary laser processing system 200 having an aperture 218 located between optical system 204 and substrate 206. The exemplary laser processing system 200 comprises a laser system 202 and an optical system 204. In embodiments the glass substrate 206, having a pre-fabricated structure 208 formed on the first surface 210, is positioned on an X-Y-Z translation mechanism (not shown). In embodiments, the pre-fabricated structure 208 is an electrode. Other suitable prefabricated structures can include, but are not limited to metal and/or polymer coatings The portion of the first surface 210 between the two parallel pre-fabricated structure 208 (e.g. electrodes) is referred to as the street width 216. In the first step 102, the object to be processed is irradiated with a pulsed laser beam that is condensed into a high aspect ratio line focus 212 that penetrates through the thickness of the glass substrate 206. Within this volume of high energy density the material is modified via nonlinear absorption of laser energy. It is important to note that without this high optical intensity, nonlinear absorption is not triggered. Below this intensity threshold, the material is transparent to the laser radiation and remains in its original state. Scanning the laser over a desired line or path creates a narrow defect line or contour or path and defines the perimeter or shape to be separated in the next step.

The laser source can create multi-photon absorption (MPA) in substantially transparent materials such as glass composite workpieces. MPA is the simultaneous absorption of two or more photons of identical or different frequencies in order to excite a molecule from one state (usually the ground state) to a higher energy electronic state (ionization). The energy difference between the involved lower and upper states of the molecule is equal to the sum of the energies of the photons. MPA, also called induced absorption, can be a second-order or third-order process (or higher order), for example, that is several orders of magnitude weaker than linear absorption. It differs from linear absorption in that the strength of second-order induced absorption can be proportional to the square of the light intensity, for example, and thus it is a nonlinear optical process.

A first portion of the laser beam focal line 212 is focused at the first surface 210 of the glass substrate 206 and a second portion of the laser beam focal line 212 is focused at a second surface 214 of the glass substrate 206. A first portion of the laser beam focal line 212 focused at the first surface 210 of the glass substrate is formed via a first set of light rays exiting the optical system 204 at a first radius R1, as measured from a center of the optical system. In embodiments, the first radius R1 is about 100 to about 1000 μm. Rays exiting the optical system 204 at first radius R1 have a first beam deflection angle $\theta_1$, measured in air after the optical system 204. A second portion of the laser beam focal line 212 focused at a second surface 214 of the glass substrate 206 is formed via a second set of light rays exiting the optical system 204 at a second radius R2, as measured from a center of the optical system. In embodiments, the second radius R2 is larger than R1 by a range from 10 μm to 100 μm. Rays exiting the optical system 204 at second radius R2 have a second beam deflection angle $\theta_2$, measured in air after the optical system 204. The first beam deflection angle $\theta_1$ of the laser beam focal line 212 is greater than the second beam deflection angle $\theta_2$, and $\theta_1$ decreases to $\theta_2$ from R1 to R2 in one of a step-wise decrease or a graded decrease. Inside the glass 206, the beam deflection angle $\theta_2$ changes to angle $\theta_{2g}$ due to refraction in the glass substrate 206. The second surface 214 of the glass substrate 206 is opposite the first surface 210, where the distance between the first surface 210 and the second surface defines the thickness of the glass substrate 206. In embodiments, the first beam deflection angle $\theta_1$, as measured in air after the optical system 204, is in the range from 5.5 degrees to 12 degrees, or in the range of 6 degrees to 12 degrees, or in the range of 10 degrees to 12 degrees. In embodiments, the second beam deflection angle $\theta_2$, as measured in air after the optical system 204, is in the range from 2 degrees to 5 degrees, or in the range of 3 degrees to 5 degrees, or in the range of 4 degrees to 5 degrees.

Once the line or contour with vertical defects or perforations is created, separation can occur via: 1) manual or mechanical stress on or around the perforated fault line; the stress or pressure should create tension that pulls both sides of the perforated fault line apart and breaks the areas that are still bonded together; 2) using a heat source, create a stress zone around the fault line to put the vertical defect or perforated fault line in tension, inducing partial or total separation In both cases, separation depends on several of the process parameters, such as laser scan speed, laser power, parameters of lenses, pulse width, repetition rate, etc.

This laser cutting process makes use of a pulsed laser in combination with optics that generates a focal line to fully perforate the body of a range of glass compositions. In some embodiments, the pulse duration of the individual pulses is in a range of greater than about 0.1 picoseconds to less than about 100 picoseconds, such as greater than about 5 picoseconds to less than about 20 picoseconds, and the repetition rate of the individual pulses can be in a range of about 1 kHz to 4 MHz, such as in a range of about 10 kHz to 650 kHz.

In addition to a single pulse operation at the aforementioned individual pulse repetition rates, the pulses can be produced in bursts of two pulses, or more (such as, for example, 3 pulses, 4, pulses, 5 pulses, 10 pulses, 15 pulses, 20 pulses, or more) separated by a duration between the individual pulses within the burst that is in a range of about 1 nsec to about 50 nsec, for example, 10 nsec to 30 nsec, such as about 20 nsec, and the burst repetition frequency can be in a range of about 1 kHz to about 200 kHz. (Bursting or producing pulse bursts is a type of laser operation where the emission of pulses is not in a uniform and steady stream but rather in tight clusters of pulses.) The pulse burst laser beam can have a wavelength selected such that the material is substantially transparent at this wavelength. The total laser power per burst measured at the material can be greater than 40 microJoules per mm thickness of material, for example 40 microJoules/mm to 2500 microJoules/mm, or 500 to 2250 microJoules/mm.

In the second step 104, the glass is moved relative to the laser beam (or the laser beam is translated relative to the glass) to create perforated lines that trace out the shape of any desired parts. The laser creates hole-like defect zones (or damage tracks, or defect lines) that penetrate the full depth the glass, with internal openings of approximately 1 micron in diameter.

The laser beam focal line can have an average spot diameter in a range of about 0.1 micron to about 5 microns, for example 1.5 microns to 3.5 microns. Once a workpiece or glass part is separated along a fault line or contour, the defect lines on the cut and separated surface can potentially still be viewed and can have a width comparable to the internal diameters of the defect lines, for example. Thus, width of defect lines on a cut surface of a glass article prepared by embodiment methods described herein can have widths of about 0.1 micron to about 5 microns, for example.

Beyond single sheets of glass, the process can also be used to cut stacks of glass and can fully perforate glass stacks of up to a few mm total height with a single laser pass. The glass stacks additionally may have air gaps in various locations; the laser process will still, in a single pass, fully perforate both the upper and lower glass layers of such a stack.

Once the glass is perforated, if the glass has sufficient internal stress, cracks will propagate along the perforation lines and the glass sheet will separate into the desired parts. An additional mechanical separation force can be applied to separate the glass parts, e.g., a subsequent pass of a $CO_2$ laser along or near the perforation line is used to create thermal stress which will separate the glass along the same pre-programmed perforation lines.

The length of the laser beam focal line can vary based factors such as laser power and optical arrangement. In embodiments, the length of the laser beam focal line is in a range of about 0.1 mm to about 10 mm, or about 0.5 mm to about 5 mm, such as about 1 mm, about 2 mm, about 3 mm, about 4 mm, about 5 mm, about 6 mm, about 7 mm, about 8 mm, or about 9 mm, or a length in a range of about 0.1 mm to about 1 mm, and an average spot diameter in a range of about 0.1 micron to about 5 microns. The holes or defect lines each can have a diameter of 0.1 microns to 10 microns, for example 0.25 microns to 5 microns (e.g., 0.2 microns to 0.75 microns).

The generation of a line focus may be performed by sending a Gaussian laser beam into an axicon lens, in which case a beam profile known as a Gauss-Bessel beam is created. Such a beam diffracts much more slowly (e.g. may maintain single micron spot sizes for ranges of hundreds of microns or millimeters as opposed to few tens of microns or less) than a Gaussian beam. Hence the depth of focus or length of intense interaction with the material may be much larger than when using a Gaussian beam only.

Figure 3:
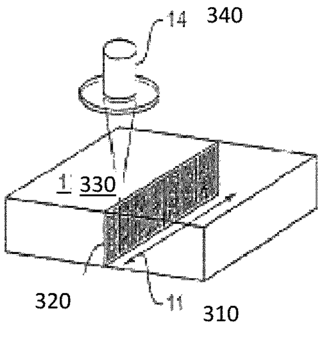
FIG. 3 is an illustration of a fault line (or perforated line) with equally spaced defect lines or damage tracks of modified glass.

As illustrated in FIG. 3, the method to cut and separate transparent materials, is essentially based on creating a fault line 310 formed of a plurality of vertical defect lines 320 in the material 330 to be processed with a pulsed laser 340. The defect lines 320 extend, for example, through the thickness of the glass sheet, and are orthogonal to the major (flat) surfaces of the glass sheet. "Fault lines" are also referred to as "contours" herein. While fault lines or contours can be linear, like the fault line 310 illustrated in FIG. 3, the fault lines or contours can also be nonlinear, having a curvature. Curved fault lines or contours can be produced by translating either the workpiece 330 or laser beam 340 with respect to the other in two dimensions instead of one dimension, for example. Depending on the material properties (absorption, CTE, stress, composition, etc.) and laser parameters chosen for processing the material 330, the creation of a fault line 310 alone can be enough to induce self-separation. In this case, no secondary separation processes, such as tension/bending forces or thermal stress created for example by a $CO_2$ laser, are necessary. As illustrated in FIG. 3, a plurality of defect lines can define a contour. The separated edge or surface with the defect lines is defined by the contour. The induced absorption creating the defect lines can produce particles on the separated edge or surface with an average diameter of less than 3 microns, resulting in a very clean cutting process.

In some cases, the created fault line is not enough to separate the material spontaneously, and a secondary step may be necessary. While the perforated glass part may be placed in a chamber such as an oven to create a bulk heating or cooling of the glass part, to create thermal stress to separate the parts along the defect line, such a process can be slow and may require large ovens or chambers to accommodate many parts or large pieces or perforated glass. If so desired, a second laser can be used to create thermal stress to separate it, for example. In embodiments, separation can be achieved, after the creation of a fault line, by application of mechanical force or by using a thermal source (e.g., an infrared laser, for example a $CO_2$ laser) to create thermal stress and force separation of the material. Another option is to have the $CO_2$ laser only start the separation and then finish the separation manually. The optional $CO_2$ laser separation is achieved, for example, with a defocused continuous wave (CW) laser emitting at 10.6 microns and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, $CO_2$ laser spot sizes of 1 mm to 20 mm, for example 1 mm to 12 mm, or 3 mm to 8 mm, or 2 mm, or 7 mm, or 20 mm can be used for $CO_2$ lasers, for example, with a $CO_2$ 10.6 μm wavelength laser. Other lasers, whose emission wavelength is also absorbed by the glass, may also be used, such as lasers with wavelengths emitting in the 9 micron to 11 micron range, for example. In such cases $CO_2$ laser with power levels of 100 Watts to 400 Watts may be used, and the beam may be scanned at speeds of 50 mm/sec to 500 mm/sec along or adjacent to the defect lines, which creates sufficient thermal stress to induce separation. The exact power levels, spot sizes, and scanning speeds chosen within the specified ranges may depend on the material use, its thickness, coefficient of thermal expansion (CTE), elastic modulus, since all of these factors influence the amount of thermal stress imparted by a specific rate of energy deposition at a given spatial location. If the spot size is too small (i.e. <1 mm), or the $CO_2$ laser power is too high (>400 W), or the scanning speed is too slow (less than 10 mm/sec), the glass may be over heated, creating ablation, melting or thermally generated cracks in the glass, which are undesirable, as they will reduce the edge strength of the separated parts. Preferably the $CO_2$ laser beam scanning speed is >50 mm/sec, in order to induce efficient and reliable part separation. However, if the spot size created by the $CO_2$ laser is too large (>20 mm), or the laser power is too low (<10 W, or in some cases <30 W), or the scanning speed is too high (>500 mm/sec), insufficient heating occurs which results in too low a thermal stress to induce reliable part separation.

There are several methods to create the defect line. The optical method of forming the line focus can take multiple forms, using donut shaped laser beams and spherical lenses, axicon lenses, diffractive elements, spatial light modulators, or other methods to form the linear region of high intensity. The type of laser (picosecond, femtosecond, etc.) and wavelength (IR, green, UV, etc.) can also be varied, as long as sufficient optical intensities are reached to create breakdown of the substrate material in the region of focus to create breakdown of the substrate material or glass workpiece, through nonlinear optical effects. Preferably, the laser is a pulse burst laser which allows for control of the energy deposition with time by adjusting the number of pulses within a given burst.

In the present application, an ultra-short pulsed laser is used to create a high aspect ratio vertical defect line in a consistent, controllable and repeatable manner. The details of the optical setup that enables the creation of this vertical defect line are described below. The essence of this concept is to use optics to create a line focus of a high intensity laser beam within a transparent part. One version of this concept is to use an axicon-like lens element in an optical lens assembly to create a region of high aspect ratio, taper-free microchannels using ultra-short pulsed laser (picoseconds or femtosecond duration) Bessel beams. Bessel beams can be thought of as a series of sequential foci through the thickness of the glass (along the laser propagation direction). Each focus is formed by a cone of light rays with a fixed height (radius) relative to the optical axis. The foci near the top surface of the glass substrate are made from cones with small radii, comprised of rays with heights near the optical axis, while the foci near the bottom surface of the glass substrate are made from cones with larger radii. The half-angle of the cone (θ) is referred to as the beam deflection angle. This angle is determined by the phase imparted by the optical system to generate and focus the Bessel beam, as defined by the system numerical aperture (NA; where NA=n sin(θ) and n is the refractive index of the propagating medium). The system NA is defined by the beam deflection angle generated in air.

The minimum clear-aperture (street-width) required to allow a focused Bessel beam to cut all the way through a glass substrate is determined by the top-surface-diameter of the cone of rays which produces a focus at the bottom surface of the glass. The minimum radius for through-glass processing is roughly equal to the tangent of the beam deflection angle multiplied by the glass thickness; however, most Bessel beams used for cutting are larger than this. Larger beam widths are required to compensate for the fact that the focal-region intensity distributions are not uniformly distributed along the laser propagation direction, instead they gradually increase and then decrease. Therefore, only a certain central portion of the generated beam will contain sufficient intensity to induce damage in the glass. A beam with focal region equal to the glass thickness may not be capable of fully imparting damage throughout the bulk. To ensure through-glass processing, the Bessel beam must be longer than the glass substrate it is cutting, and its width must therefore be wider than the minimum necessary to get through the glass thickness. However, the requirement for larger laser beams means that excess energy will be incident upon the surface of the glass substrate, impacting the diameter of the laser-affected zone (LAZ) and the capability to process through narrow streets.

When the effective NA of the optical system is reduced, the beam deflection angle decreases and the resulting focal spot size becomes larger. If the crack direction is controlled, the spot becomes elliptical and its maximum radius increases further. When the beam hits the front surface of the glass, ablation will be triggered in the intense focal spot of the Bessel beam. This will leave behind a defect on the surface roughly the size and shape of the focal spot. Increased laser absorption and material ablation can sometimes occur if a second shot overlaps this surface defect. This can cause problems such as cracking when the pitch (center-to-center distance) between shots is less than the focal spot radius on the surface. Although increasing the pitch or reducing the laser energy can minimize undesirable cracking, the corresponding reduction in shot frequency or intensity can generate insufficient substrate damage, increasing the break-resistance and the likelihood of cleaving outside of the damage plane. It is therefore advantageous to have a smaller spot size on the front surface in order to cut glass using a lower pitch. A smaller spot size on the front surface can be accomplished without increasing the required street width by radially varying the system's NA throughout the focal region.

Defects formed by low deflection angle Bessel beams can be very weak near the front surface of the glass workpiece. Such weak defects occur even when using a beam with a long, flat intensity profile and when aligning the beam so that its most intense region coincides with the front-surface of the glass. When the effective NA of the Bessel-generating optical system is very low, for example less than 0.06, the laser-induced damage line may not be present/well-formed near the front surface of the glass. If the defect produced by the Bessel beam does not sufficiently connect to the front surface, the cleaving plane will only follow the defect plane partway through the glass, thereby greatly increasing break resistance and a risk of the break deviating from the defect plane entirely.

The deflection angle of a Bessel beam is dependent on the angle of the axicon lens used to generate it. By varying the axicon angle as a function of radius, the beam deflection angle and corresponding depth of focus of individual ray cones can be directly controlled. For processing in narrow street widths, the beam deflection angle should be high for rays emanating from the center of the input beam and focusing near the front surface of the substrate and reduced for rays emanating from the edges of the input beam and focusing near the back surface of the substrate. Since the depth at which a cone of rays focuses to depends on the angle of the rays in that area, reducing the beam deflection angle will cause rays to focus further from the lens. If the beam deflection angle is reduced sharply in a single step, a gap will appear in the beam where there is a low intensity focal spot. To avoid this issue, the beam deflection angle will be changed gradually.

Figure 4A:
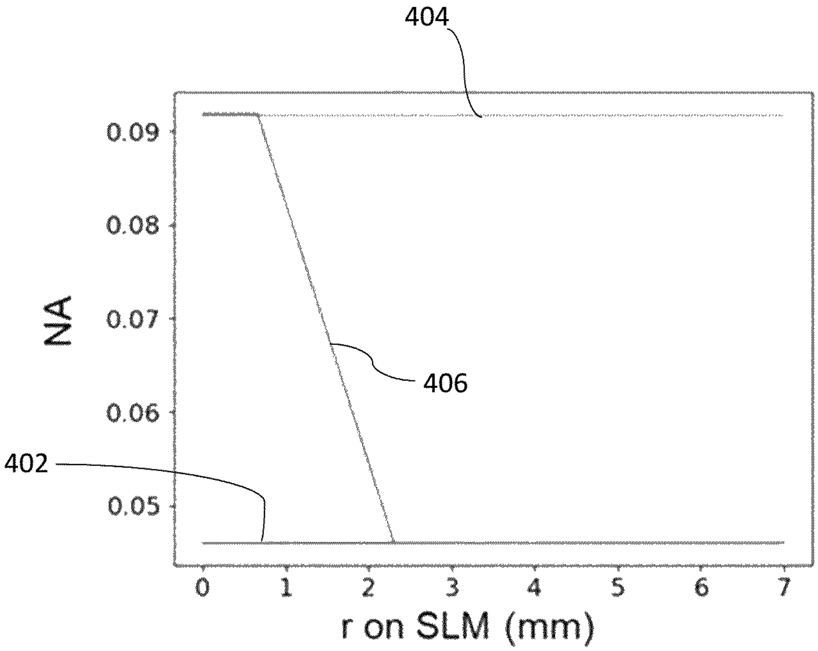
FIGS. 4A and 4B compare fixed and radially-decreasing system NAs and the resulting beam intensity distributions along the laser propagation direction.
Figure 4B:
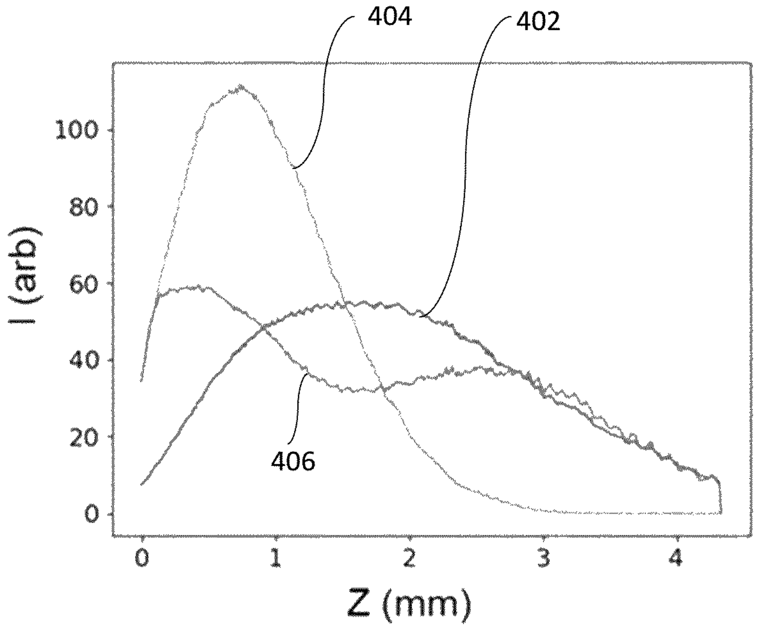

FIG. 4A compares fixed and radially-decreasing system NAs and FIG. 4B shows the resulting beam intensity distributions along the laser propagation direction. The radially-variable system begins with a central NA of 0.09 and its intensity profile mirrors that of a 0.09 NA beam. As NA begins to decrease, the resulting beam intensity will decrease until it corresponds to the beam generated by a 0.045 system NA. Since NA is the derivative of optic height, a linearly decreasing NA such as that shown in FIG. 4A is the result of an optic height that varies as h=c*r2 where c is an arbitrary constant. This is the formula for the height of a diverging lens, and indeed the sloped profile in the middle of FIG. 4A can be created by adding the phases of a diverging lens and an axicon lens. The intensity profile in FIG. 4B is sharp due to the rapid change in the slope of system NA. To smooth this out and give more control of the profile, a different lens shape may be used instead of the linear decrease in NA seen in FIG. 4A. FIG. 4B depicts the intensity vs. laser propagation distance for three beams generated using different system NAs: fixed at 0.046 (blue line 402), fixed at 0.092 (orange line 404) and varying from 0.092 at the beam edge to 0.46 at the beam center (green line 406). The green 406 intensity profile follows the orange 404 and blue 402 lines when it shares the same system NA as these beams. It deviates from the other distributions in the middle of the focal region as a result of the negative change in NA, which reduces the intensity in this region.

Figure 5:
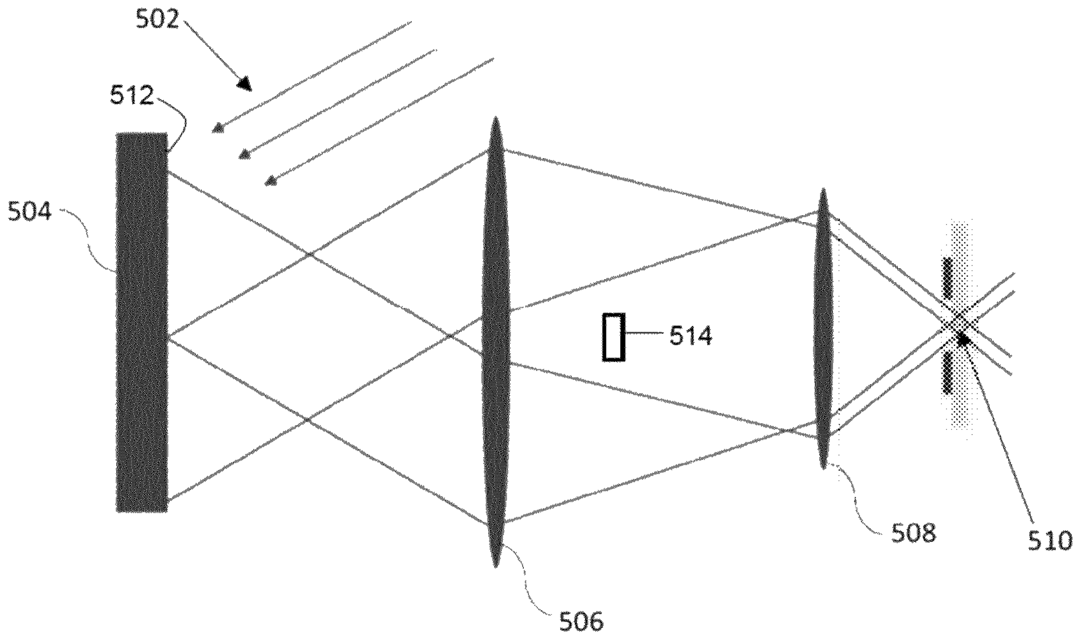
FIG. 5 is an illustration of an optical assembly for laser processing according to one embodiment.

Representative optical systems 204, which can be applied to generate the focal line, as well as a representative optical setup, in which these optical systems 204 can be applied, are described below. FIG. 5 depicts an exemplary optical system 204 to generate the focal line having a spatial light modulator 504 (or other suitable diffractive optical element), a first focusing optical element 506, and a second focusing optical element 508. The embodiment of FIG. 5 is exemplary only and is not intended to be limiting in the setup of an optical system capable for generating the focal line described herein. FIG. 5 depicts a laser beam 502 reflecting off the spatial light modulator 504 and being focused through the first focusing optical element 506 and the second focusing element 508 to form a demagnified conjugate image of the beam at the focal point 510 of the second focusing element 508. In some embodiments, the ratio of the focal length of the first focusing optical element 506 to the focal length of the second focusing element 508 is about 5:1 to about 50:1.

In order to reduce the LAZ on the glass front surface, an aperture is used to truncate the input beam size. This aperture may be placed just before or after a refractive axicon or SLM or it can be directly written to the phase mask on the SLM. Auxiliary methods to input beam truncation, such as input beam demagnification could be used in the place of an aperture. Adding an aperture to the beam will add some oscillation to the intensity along its focal length due to diffractive effects from the hard edge. These ripples can cause the amount of damage being done to a substrate to fluctuate through the beam's length and interfere with the cutting process. To counteract these fluctuations, additional spatial filters may be added in the frequency domain (sometimes called spatial filters). Generally, this is placed between the two lenses of the system at the focal spot of the first lens; however, it may also be placed shortly after the final lens in the system.

To minimize the LAZ on the back surface of the glass, a small beam block 512 can be implemented to prevent centralized input beam rays, focusing prior to the front surface of the glass, from passing through the glass and creating large-area damage on the rear surface. The beam block can be written directly to the SLM or implemented as a standalone element.

While exemplary embodiments have been disclosed herein, it will be understood by those skilled in the art that various changes in form and details may be made therein without departing from the scope of the invention encompassed by the appended claims.

What is claimed is:

1. A method of laser processing a glass substrate, the method comprising:

focusing a pulsed laser beam into a laser beam focal line, which is formed via an optical arrangement and oriented along the beam propagation direction and directed into the glass substrate, the glass substrate having a feature formed on a first surface of the glass substrate, the laser beam focal line generating an induced absorption within the glass substrate, and the induced absorption producing a defect line along the laser beam focal line within the substrate, wherein a first portion of the laser beam focal line is focused at the first surface of the glass substrate and a second portion of the laser beam focal line is focused at a second surface of the glass substrate that is opposite the first surface, wherein a first set of light rays exiting the optical arrangement at a first radius R1, as measured in a first direction from a center of the optical arrangement forms the first portion of the laser beam focal line with a deflection angle of $\theta_1$, wherein a second set of light rays exiting the optical arrangement at a second radius R2, as measured in a second direction opposite to the first direction from the center of the optical arrangement forms the second portion of the laser beam focal line with a deflection angle of $\theta_2$, wherein R1 is less than R2; and wherein $\theta_1$ is greater than $\theta_2$, and wherein $\theta_1$ decreases to $\theta_2$ from R1 to R2 in one of a step-wise decrease or a graded decrease; and translating the glass substrate and the laser beam relative to each other along a first contour, thereby laser forming a plurality of defect lines along the first contour within the substrate.

2. The method of claim 1, wherein the first beam deflection angle $\theta_1$ is in a range from 5.5 degrees to 12 degrees.

3. The method of claim 1, wherein the second beam deflection angle $\theta_2$ is in a range from 2 degrees to 5 degrees.

4. The method of claim 1, wherein the first radius R1 is in a range from 100 μm to 1000 μm.

5. The method of claim 1, wherein the second radius R2 is larger than R1 by a range from 10 μm to 100 μm.

6. The method of claim 1, wherein the optical arrangement comprises: a spatial light modulator or diffractive optical element configured to generate the laser beam focal line, a first focusing optical element spaced apart from the spatial light modulator or diffractive optical element, and a second focusing optical element spaced apart from the first focusing optical element, wherein a ratio of the focal length of the first focusing optical element to the focal length of the second focusing optical element is 5:1 to 50:1.

7. The method of claim 6, wherein an aperture is written on a surface of the spatial light modulator or diffractive optical element.

8. The method of claim 6, wherein an aperture is positioned before the spatial light modulator or diffractive optical element.

9. The method of claim 6, wherein a beam block is written on a surface of the spatial light modulator or diffractive optical element at the approximate center of the input light source.

10. The method of claim 6, wherein a beam block as a standalone element is placed before the spatial light modulator or before the diffractive optical element at the approximate center of the input light source.

11. The method of claim 6, wherein an aperture is positioned between the spatial light modulator or diffractive optical element and the first focusing optical element.

12. The method of claim 6, wherein the optical arrangement further comprises a diffraction effect reducing filter positioned after the first focusing optical element.

13. The method of claim 1, wherein the pulsed laser beam comprises pulse bursts with 2 to 20 pulses per pulse burst, with pulse burst energy of 200 to 2000 micro-Joules per pulse burst.

14. The method of claim 13, wherein the pulse bursts have a repetition rate in a range of 1 kHz to 200 kHz.

15. The method of claim 1, further comprising separating the substrate along the first contour.

16. The method of claim 15, wherein separating the substrate along the first contour includes at least one of (i) applying a mechanical force to the substrate; (ii) directing a carbon dioxide ($CO_2$) laser beam into the substrate along or near the first contour; or (iii) applying an etchant to the first contour.

17. The method of claim 1, wherein the pulses have a duration of greater than 2 picosecond.

18. The method of claim 1, wherein the laser beam focal line has an average spot diameter in a range of 0.5 micron to 5 micron.

19. The method of claim 1, wherein the substrate has a thickness in a range of 0.5 mm to 2 mm.

* * * * *